(12) United States Patent
Graveson et al.

(10) Patent No.: US 7,267,744 B2
(45) Date of Patent: Sep. 11, 2007

(54) PULP TREATMENT AND PROCESS

(75) Inventors: Ian Graveson, Johannesburg (ZA); Heinzhorst Mobius, Johannesburg (ZA); Derek Andrew Weightman, Johannesburg (ZA)

(73) Assignee: Sappi Limited, Johannesburg (ZA)

(*) Notice: Subject to any disclaimer, the term of this patent is extended or adjusted under 35 U.S.C. 154(b) by 0 days.

(21) Appl. No.: 10/471,845

(22) PCT Filed: Mar. 14, 2002

(86) PCT No.: PCT/ZA02/00032

§ 371 (c)(1),
(2), (4) Date: Feb. 20, 2004

(87) PCT Pub. No.: WO02/074813

PCT Pub. Date: Sep. 26, 2002

(65) Prior Publication Data

US 2004/0129394 A1 Jul. 8, 2004

(30) Foreign Application Priority Data

Mar. 15, 2001 (ZA) .................................. 01/2162

(51) Int. Cl.
*C09B 9/00* (2006.01)
*D21C 9/00* (2006.01)

(52) U.S. Cl. .................... 162/50; 162/49; 162/88; 162/78; 162/89; 162/65; 204/157.15; 205/690

(58) Field of Classification Search ............ 162/65–67, 162/87, 88–89, 49–50, 78; 204/157.15; 205/688–690

See application file for complete search history.

(56) References Cited

U.S. PATENT DOCUMENTS

| 2,161,045 | A | * | 6/1939 | Hirschkind et al. | ........... 162/50 |
| 4,222,819 | A | * | 9/1980 | Fossum et al. | ............... 162/76 |
| 4,617,099 | A | * | 10/1986 | Schwab et al. | ............. 204/133 |
| 6,187,170 | B1 | * | 2/2001 | Hampp | ....................... 205/688 |

(Continued)

FOREIGN PATENT DOCUMENTS

DE 1 928 045 1/1970

(Continued)

OTHER PUBLICATIONS

Stepanik, et al; Electron Processing Technology: A Promising Application for the Viscose Industry, Presented at the 10th International Meeting on Radiation Processing, May 11-16, 1997; Anaheim, CA.*

*Primary Examiner*—José A. Fortuna
(74) *Attorney, Agent, or Firm*—Nixon Peabody LLP; Jeffrey L. Costellia

(57) ABSTRACT

This invention provides a process for treating chemical woodpulp, or chemical cellulose including cotton linter, including the step of applying an electron processing technology (EPT) step to chemical woodpulp, or chemical cellulose, as the case may be, on an in-line basis to provide control of pulp viscosity or degree of polymerization (DP). The invention also provides a method of process control in treating the aforementioned woodpulp or cellulose, including the step of using radiation dose-viscosity relationship curve for applying an EPT step on an in-line basis. The in-line EPT step may, in one form of the invention, replace and hence eliminate a chemical DP reduction step.

10 Claims, 6 Drawing Sheets

PROCESS FLOW DIAGRAM

U.S. PATENT DOCUMENTS

2004/0129394 A1 * 7/2004 Graveson et al. ............ 162/49

FOREIGN PATENT DOCUMENTS

| DE | 29 41 624 | 5/1980 |
| DE | 222 887 A1 | 5/1985 |
| DE | 198 47 755 A1 | 4/2000 |
| SU | 1669916 | 8/1991 |
| WO | WO02074813 A1 * | 9/2002 |

* cited by examiner

PROCESS FLOW DIAGRAM

PULP TREATMENT AND PROCESS

INTRODUCTION

This invention relates to pulp treatment and process. More particularly, this invention relates to electron beam treatment or processing of chemical woodpulp.

BACKGROUND TO THE INVENTION

Electron beam processing or electron processing technology (EPT) of chemical wood pulp has been known and studied for many years, particularly in eastern European countries. Such studies have included laboratory and plant scale tests of viscose and fibre quality.

Dissolving pulp is electron treated off-line before going to a viscose process. High energy electrons interact with cellulose resulting in two main effects, namely cellulose activation and degree of polymerisation (DP) reduction. The aforementioned effects can give rise to significant benefits in a viscose process such as savings in chemical consumption (of compounds such as carbon disulfide, sodium hydroxide and sulphuric acid), and a reduction in environmental pollution in the pulping process and potentially also environmental benefits in a customers process.

As far as the applicant is aware, the earliest patent in this field was known as the Wolfen patent, with inventors Fisher K, Goldberg W and Wilkie M and was granted to the company Dresden/Fisher (DE 2941624/DD WP208708). The aforementioned patent described the benefits of electron beam treatment for the viscose process in terms of chemical savings due to the activating effect of the treatment.

Since the aforementioned patent, a number of patent applications and granted patents have been published. Consequently the field of EPT for pulp and viscose pulp activation has been well researched and explored, and hence is well known.

The higher the electron beam energy, obviously the more penetrating it is. The lowest beam energy that is of practical use is about 250 keV but there is probably no upper limit. The present practical upper limit is probably 50 MeV as no larger machines exist, but more probably is 12 MeV as above this level radioisotopes can form. A further possible limiting factor for upper energy levels is that, the higher the energy, the thicker the shielding that is required. For example, a 300 keV machine can be used effectively unshielded (—it is self shielded with a lead coating on the surface of the machine).

This type of technology is typically used, for example for curing surface coatings but anything of higher energy typically needs proper (external) shielding which is typically made of concrete for machines above about 500 keV.

Another limiting factor in EPT of chemical woodpulp is that such treatment to-date has been carried out on an off-line basis which increases processing cost by way of additional pulp handling, and by way of additional processing or production time.

An observation when using high energy electrons, or even gamma rays, is that their effect is to break down the molecular weight of the cellulose and polymer in a non-linear manner with respect to the applied dosage. An initial dose gives rise to a large reduction in DP which then levels off as dosage is increased. Apparently it has been assumed by workers in this field—and there does not appear to be any literature to suggest otherwise—that the starting DP needs to be known accurately in order to arrive at an accurate final DP.

The present method of off-line pulp processing not only requires that the starting DP be known but is also prone to variability of product when pulp stacks are used due to variable heights and to edge to middle of stack effects. It also produces a product which is inherently more variable and of lower 'quality' than a single sheet treatment. For single sheet processing off-line the level of handling required makes the costs excessive and uneconomic.

OBJECTS OF THE INVENTION

It is therefore an object of the present invention to provide a process for treating chemical woodpulp including an EPT step, which is novel and inventive relative to the state of the art.

It is also an object of the present invention to provide a process which overcomes, at least partly, the disadvantages associated with prior art processes.

SUMMARY OF THE INVENTION

According to one aspect of the present invention, there is provided a process for treating chemical woodpulp including the step of applying an electron processing technology (EPT) step to chemical woodpulp on an in-line basis to provide control of pulp viscosity or degree of polymerisation (DP).

The process may include the step of applying a radiation dose in the range of about 1.5 to 25 kGrays.

The in-line EPT step may replace and hence eliminate a chemical DP reduction step.

The DP reduction step may be a hypochlorite treatment stage.

The EPT step may be applied after a normal or partial hypochlorite step in the form of a low dose as a viscosity trimming stage to reduce the quantity of potentially off-specification material.

The trimming dose applied may be between about 0.1 kGray and 5 kGray.

No measurement of DP need be taken post a cooking/digestion stage other than that needed to control such stage [DP(0)] and a fixed radiation dose may be applied to reach a selected final product viscosity.

The final product viscosity may be in the range of either about 14 to 20 cPs or about 4 to 7 cPs.

The process may include the EPT step to trim DP after a specified DP reduction stage or may include the step of subjecting woodpulp to a higher radiation dosage after a last non-DP reducing step and after eliminating the DP reduction step or reducing an applied chemical dose.

The process may include the step of reducing environmental problems generally seen in conventional chemical woodpulp production by significantly reducing or eliminating absorbable organic halide (AOX) and/or total organic halide (TOX) production.

The process may produce a pulp having a significantly reduced DP variability over pulp produced by conventional chemical processes when fed with a broad range of pulp viscosities from the previous stage of the process(es).

The process may also produce a pulp having a lower DP variability than an equivalent pulp produced by a process including an EPT step applied to an equivalent pulp sample off-line in a conventional economical multiple sheet/partial bale treatment methodology.

The process may produce a final product having a viscosity in the range of about 7 to 20 cPs for use in non-staple fibre viscose production including viscose filament, industrial fibre, tyre cord, and the like products.

According to another aspect of the present invention, there is provided a process for treating chemical cellulose including the step of applying an EPT step to chemical cellulose including cotton linter on an in-line basis to provide control of pulp viscosity or DP.

The aforementioned process may include the step(s) as hereinbefore described.

According to yet another aspect of the present invention, there is provided a method of process control in treating chemical woodpulp, including the step of using a radiation dose-viscosity relationship curve for applying an EPT step on an in-line basis.

The method may include the step of using a relationship or curve approximating to a log, power or exponential response, or the like response.

The aforementioned relationship or curve approximates to a log, power or exponential response, or a similar response. Examples, for illustrative purposes might be, a plot with dose on the X axis and DP (measured in cPs) on the Y axis is described by the expression $y=-2.08 \ln(x)+11.6$ for low energy eg. gamma radiation; and by $y=13.67x^{-0.3786}$ for an intermediate energy system (300-3000 keV) and $y=-2.19 \ln(x)+11.87$ for a higher energy eg. 3-10 MeV electron beam system.

The method may include the step of controlling viscosity reduction or DP of the woodpulp The pulp produced may have a reduced DP variability over pulp produced by conventional chemical processes when fed with a broad range of pulp viscosities.

The pulp produced may have a lower DP variability than an equivalent pulp produced by a process including an EPT step applied to an equivalent pulp sample off-line in a conventional economical multiple sheet/partial bale treatment methodology.

An interesting effect of the aforementioned is that if one does not know what the starting DP is (within a broad range), and a fixed dose of radiation is applied, one may still obtain a narrower range of final DP than using a hypochlorite step.

The process extends to reducing off-spec material as produced by conventional chemical treatment of pulp (ie. Wood digestion followed by a bleaching sequence including any combination of treatment by oxygen (O), chlorine (C), sodium hydroxide (E), chlorine dioxide (D), hydrogen peroxide (P), ozone (Z) and/or sodium hypochlorite (H) but preferably being ODEDH or any similar or other bleaching agent typically used in pulp processing) by including the steps of using EPT to trim DP after the specified DP reduction stage (usually H) or subjecting pulp to a higher radiation dose after the last non DP reducing step (E, D, P but typically D) and after eliminating the DP reduction step (typically H) or reducing the applied chemical dose (of, for example H).

The aforementioned process may reduce environmental problems and may enable a so-called totally chlorine free (TCF) process to be developed.

The invention may provide an improved pulp product having a smaller DP range.

The invention finally relates to an improved product for use inter alia in viscose manufacture, which is activated, i.e. in the range of about 4 to 7 cPs.

DETAILED DESCRIPTION OF THE INVENTION

The invention will now be described in greater detail, by way of non-limiting example, with reference to the following drawings, in which.

Figure 1:
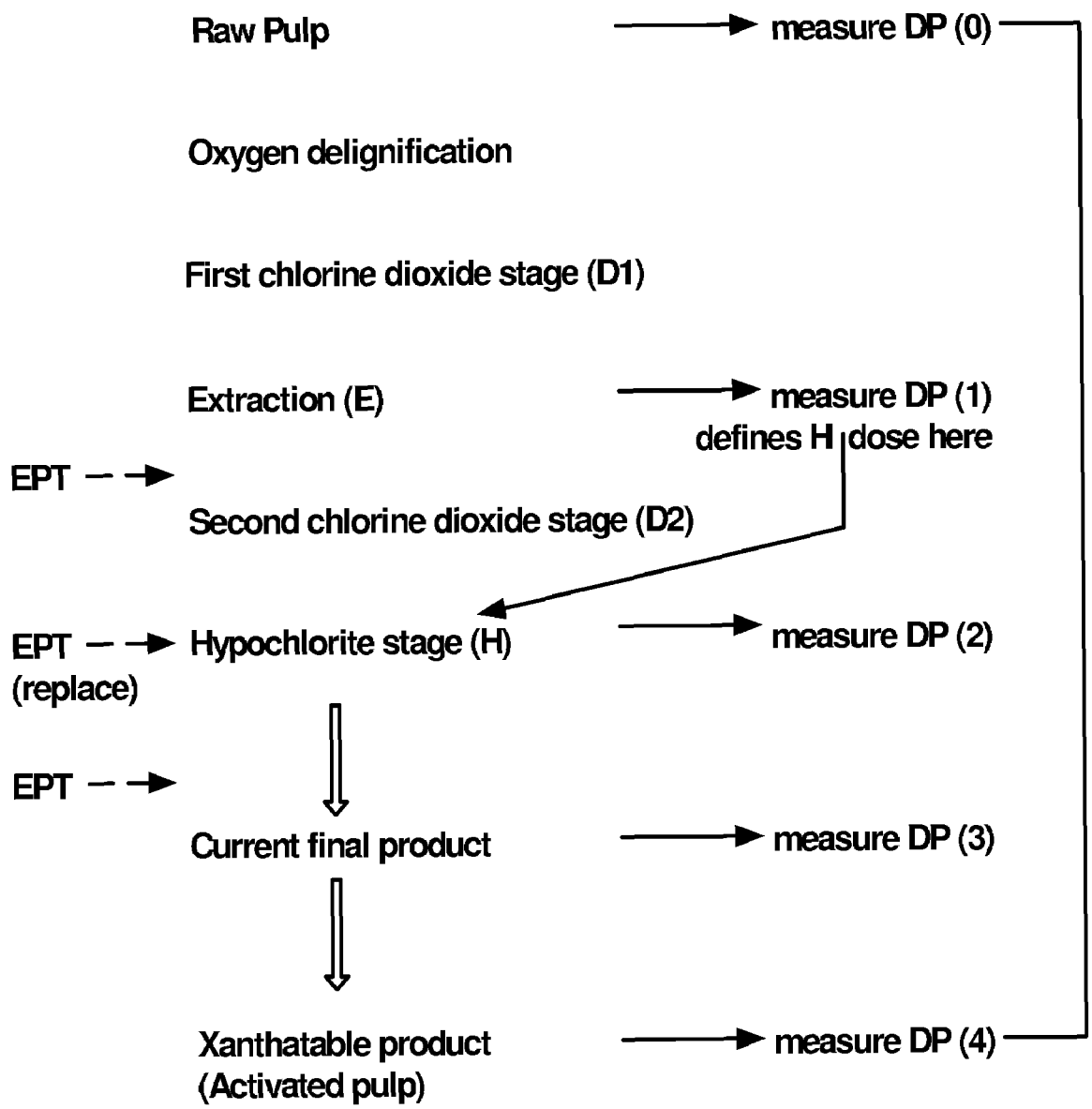
FIG. 1 shows a process flow diagram showing both a conventional DEDH sequence, and EPT processing according to certain aspects of the present invention.

Before discussing the above figures, an explanation is given as to the method used for measuring the degree of polymerisation (DP) of woodpulp, more particularly known as dissolving pulp.

Method Of Measuring Degree Of Polymerisation

Scope

The viscosity value is a measure of the degree of polymerisation for dissolving pulp. The viscosity measured is of a 1% solution of cellulose in cuprammonium solution using an Ostwald viscometer.

Principles

A specified amount of pulp is dissolved in a mixture of sodium hydroxide and cuprammonium hydroxide. The dissolved cellulose is sucked up an Ostwald viscometer and the time taken for it to flow between the two measured points is recorded and the viscosity calculated from the specific viscometer coefficient.

Reagents

Cuprammonium Solution (aqueous solution of 164 g/l ammonia and 23.9 g/l Copper)

Sodium Hydroxide 1 N

Equipment

Disintegrator

Balance 200 g±0.001 g

Glass bottles 100 ml+stopper mechanical shaker water bath at 20° C.

Ostwald viscometers 1.2 mm, 1.5 mm or 1.7 mm bore size

Stopwatch/timer

Sample Preparation

The pulp was disintegrated into a fluff using a mechanical disintegrator or a Waring blender.

Analytical Procedure

A moisture determination was done of the disintegrated pulp sample by drying exactly 10 g of pulp at 125-135° C. for 1 hour. From the value obtained, the amount of pulp equivalent to exactly 1 g of dry pulp was calculated using equation 1. This calculated quantity of air dried pulp was weighed out and placed into a 100 ml bottle. The bottle is to be clean and dry having been in a drying oven and subsequently cooled.

15 ml of 1N NaOH was dispensed, thoroughly wetting the pulp. 85 ml of cuprammonium was dispensed into the bottle. The air gap between the solution and stopper was minimised by suitably insoluble objects placed in the bottle. The bottle was then stoppered and placed in a mechanical shaker for a minimum of 45 minutes.

The bottle was then transferred to a thermostat controlled water bath at precisely 20° C. and allowed to stand for 1 hour (60 minutes) to ensure that the temperature of the solution was 20° C.

The solution was sucked up into the 25 ml Ostwald viscometer which was enclosed in a water jacket through which water at 20° C.±1° C. was passed. As the solution flowed out of the viscometer capillary a stopwatch was used to measure the time taken for the liquid level to pass from the upper to the lower mark. Equation 2 was then used to calculate the viscosity in cPs.

Calculations

The amount of pulp required to give 1 g of bone dry pulp is:

equation 1:
$$\frac{1 \times 100}{(100 - \% \text{ wet moisture})} = 1 \text{ g bone dry weight of pulp}$$

Viscosity (TAPPI)=(Time in seconds×1.02×viscometer coefficient)/1.56    equation 2:

Calculation of viscometer co-efficient (k) using standard oil of known viscosity and density at 20° C.

$$k = \frac{\text{Viscosity of oil}}{\text{time of flow secs} \times \text{density of oil}}$$

Viscometer coefficient for measuring pulp viscosities=1.02 k.
  1.02 is the density of cellulose in cuprammonia solution
  1.56 is the conversion factor from Snia viscosity to Tappi T-206

With reference to FIG. 1, it will be seen that raw pulp is firstly subjected to an oxygen delignification step whereafter it is subjected to a first chlorine dioxide step (D1). Thereafter an extraction step (E) is applied which is followed by a second chlorine dioxide step (D2). A hypochlorite step (H) is then applied to render a current final product according to conventional chemical processing, i.e. the DEDH sequence.

According to the DEDH sequence, i.e. using the conventional chemical route, if the target viscosity for dissolving pulp is, for example 18 cPs, one would typically obtain a product with a range of viscosities in the region of 4 to 5 cPs wide, with about 95% within this range. A viscose manufacturer, manufacturing for example a viscose staple fibre (VSF) type product has to use the aforementioned pulp and reduce the DP further in their process to arrive at a viscosity of about 4 to 7 cPs.

In the event that EPT processing is applied, this may for example be applied after the extraction stage (E), where normally a first crude DP measurement is made DP(1) if the H-stage is to be used. (The Coefficient of Variation (CoV) of the DP test taken at this stage is typically about 5%). After determining this crude viscosity, this would determine the required hypochlorite dose at the step H, to provide a current final product. It should be noted that a measurement made on the final dried pulp product is much more accurate giving a CoV of about 2%.

Figure 2:
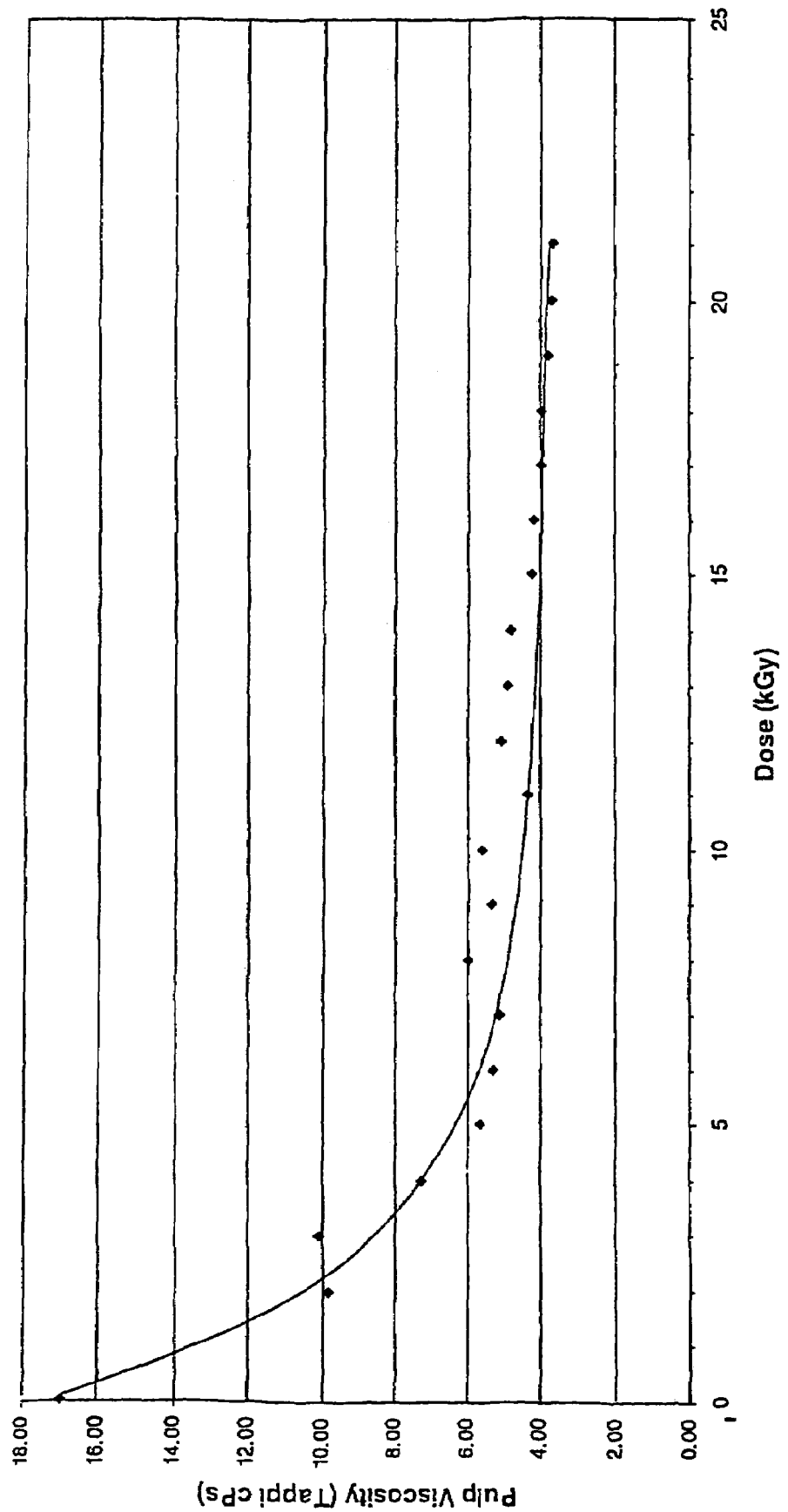
FIG. 2 shows a graph of a radiation dose-pulp viscosity (17 cPs) relationship or curve that forms part of and according to one aspect of the present invention.
Figure 3:
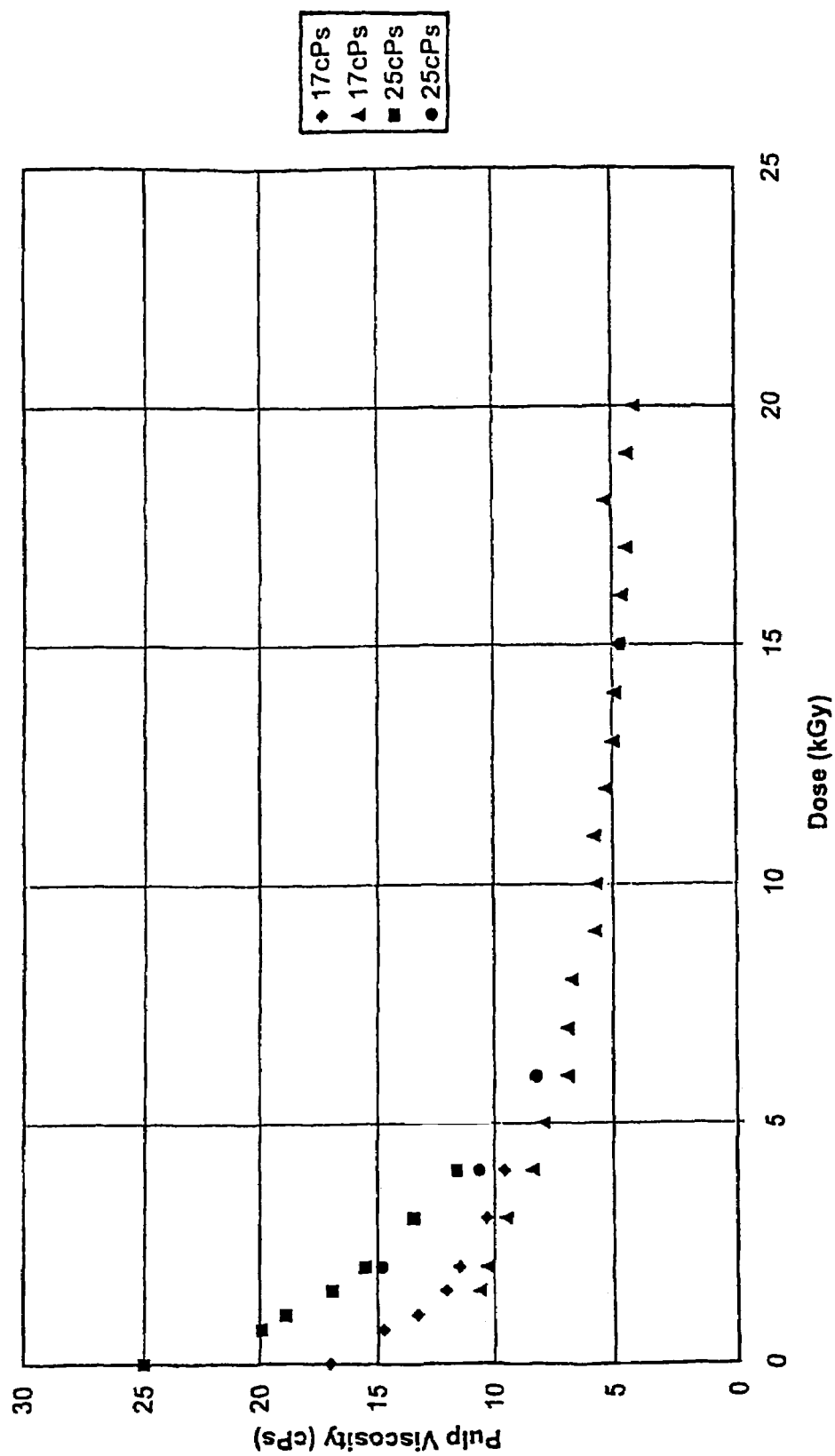
FIG. 3 shows a graph of a radiation dose-pulp viscosity (17 cPs and 25 cPs) relationship or curve that also forms part of and according to another aspect of the present invention.

In terms of the present invention and with reference to FIG. 1 and FIGS. 2 and 3, it will be seen that the curves in FIGS. 2 and 3 approximate to a log, power or exponential response, or a similar response. After measuring DP(1), a dose of <5 kGray, preferably about 1.5 to 3 kGray, was applied to get the viscosity in the range of about 14 to 20 cPs. Alternatively, a higher dose of about 10 kGray or more, for example up to about 25 kGray, preferably about 12 to 16 kGray, was applied to obtain a viscosity of about 4 to 6 cPs, thereby to obtain activated pulp for viscose manufacture.

In another form of the invention, after measuring DP(1) and applying an (H) dose, the viscosity was crudely measured a second time namely DP(2). A dose of about 15 to 16 kGray was applied to give a final DP of about 4 to 6 cPs. This would provide activated pulp for viscose production. Alternatively, a trimming dose of radiation was applied if the DP was too high. In-specification pulp was recovered by dosing at about 0.1 to 5 kGray (based on the DP(2) value). This reduced the percentage of off-spec material and provided a final viscosity in a customers specified range of 14 to 20 cPs. It should be noted that it is probably not even necessary to measure DP(1) or DP(2) if a final viscosity in the 4 to 7 cPs range is required as the reduction in DP as a function of dose is rather insensitive.

The invention as described above indicates that the process provides an amount of flexibility in terms of process choices and more particularly various forms of process control. For example the invention permits one either to measure the DP post the E step (of a DEDH sequence) which is about 2.5 to 3 hours before the H step. An e-beam dosage could then be applied instead of hypochlorite treatment, or one could measure the DP post the H step and correct any process errors at that stage by either a trimming dose (if the viscosity was too high) or a full dose if required to generate the activated viscose pulp. In other words, the invention provides various process options.

EXAMPLE 1

VSF pulps are produced typically in the range of about 14 to 25 cPs for sulphite pulps. In producing this range of pulp there is typically a percentage of production that falls outside the specified ranges produced for customers of this product, typically about 3 to 5%.

With particular reference to FIG. 3, using EPT dosing in the range of about 0.1 to 5 kGray, this out-of-specification material was effectively eliminated using FIG. 3 and the values DP(1) or DP(2) to apply a trimming dose of radiation.

EXAMPLE 2

Figure 4:
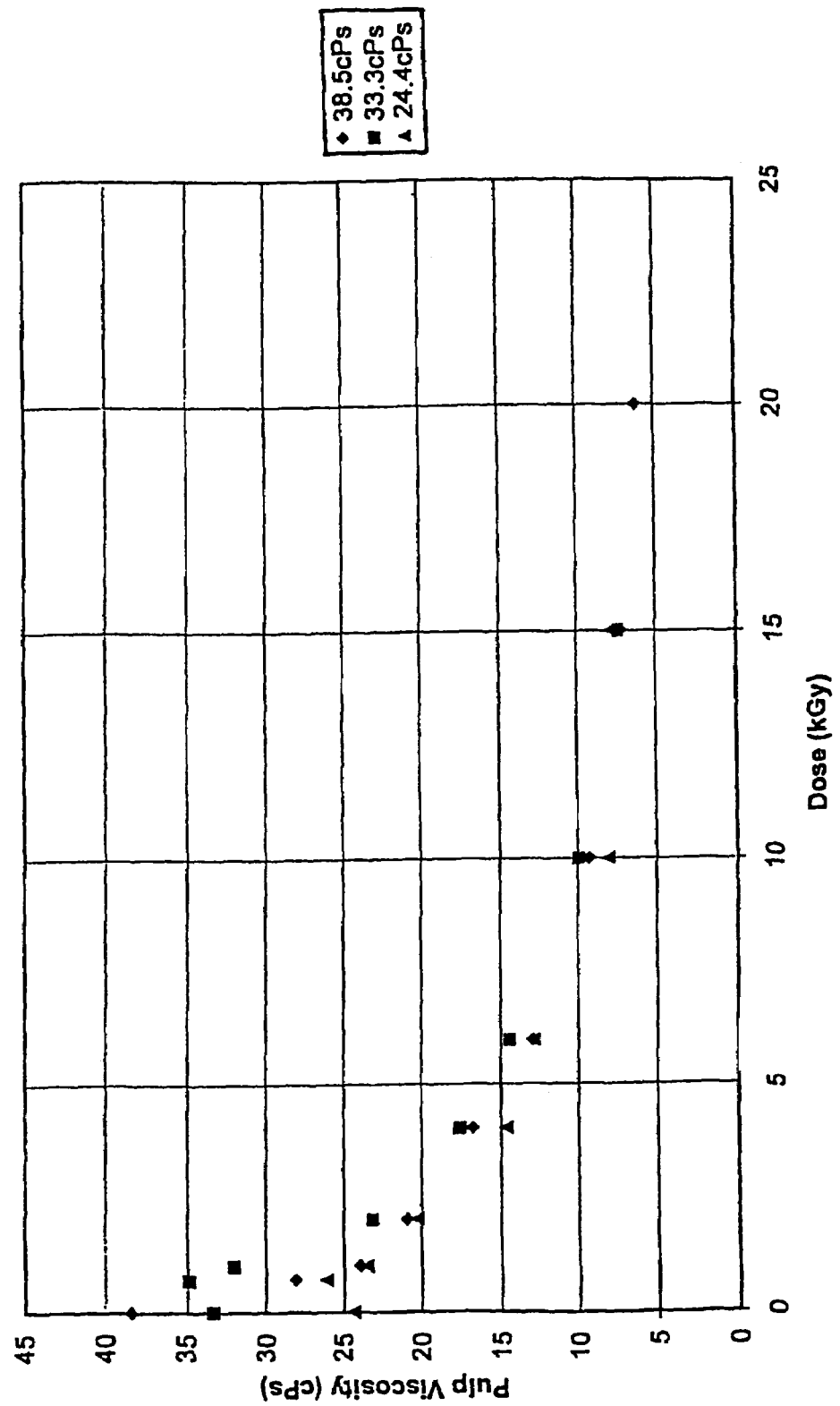
FIG. 4 shows a graph of a radiation dose-pulp viscosity curve post a D2 step that also forms part of and according to yet another aspect of the present invention.

With particular reference to FIG. 4, post D(2) pulps of different values of DP(1) viscosity were irradiated in the same manner as post DP reduction pulp. This provided final products in either the conventional VSF type product viscosity range, i.e. in the range of about 14 to 25 cPs; or at a higher dose that provided an activated product for use in the VSF process in the range of about 4 to 6 cPs.

EXAMPLE 3

Figure 5:
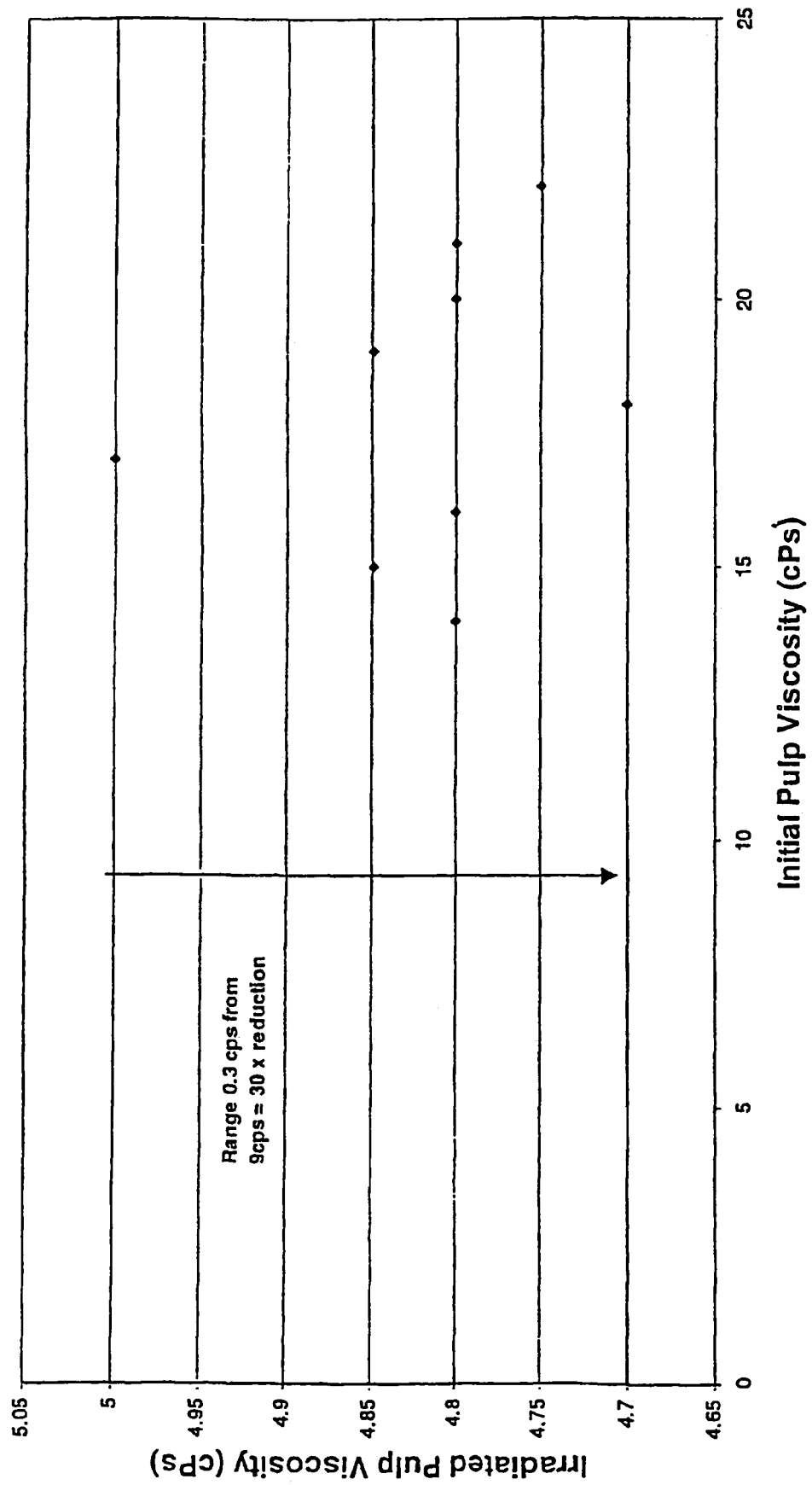
FIG. 5 shows a graph illustrating the effect of varying initial pulp viscosity with a fixed 15 kGray radiation dose according to a further aspect of the present invention.

With particular reference to FIG. 5, when a fixed dose of electron beam irradiation, for example about 15 kGray, was applied to pulp to produce a material for a VSF process, a significant reduction in final product variability was obtained. Taking pulps in the viscosity range from about 14 cPs to about 22 cPs inclusive (—a range of about 9 cPs) at 1 cPs intervals and at a fixed 15 kGray dose, the variability across these products was reduced to only about 0.3 cPs.

This should be compared to a typical chemical process that gives a viscosity range of about 4 to 5 cPs. An industry best viscosity variation has a range of about 2 cPs.

EXAMPLE 4

As indicated previously, the existing, i.e. conventional pulp irradiation process is an off-line treatment. The starting DP is accurately known and based on the irradiation equipment and the final required viscosity/dose, an optimum number of pulp sheets for a minimum cost process can be determined.

Figure 6:
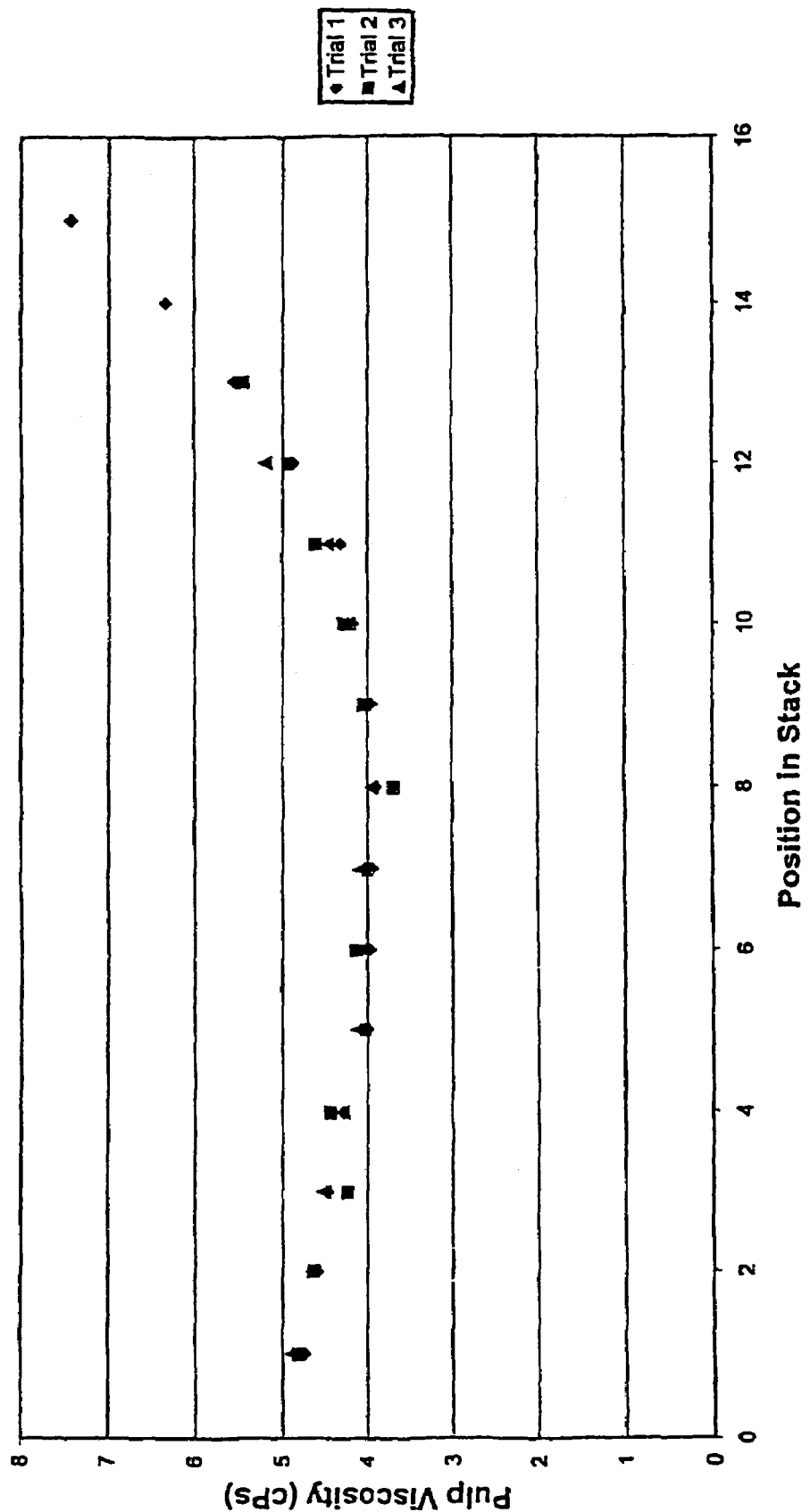
FIG. 6 shows a graph illustrating pulp viscosity relative to position in pulp stacks according to current practice in industry.

In this example with various tests, and with particular reference to FIG. 6, the optimum number of sheets indicated by the equipment supplier was 12 pulp sheets. When irradiated at the prescribed dose of 15 kGray, the results were as shown in FIG. 6. The viscosity variability obtained was about 1.2 cPs on average.

The invention therefore provides a method of reducing off-spec material as against the conventional chemical route by using the process to trim or adjust the DP post the H stage or to apply higher dose of radiation post the DP(2) stage and thereby save on hypochlorite. This results in a chemicals saving and an environmental pollution abatement or improvement.

The invention also provides an improvement of the product quality in terns of a reduced DP range/variability at the normal 14 to 20 cPs standard viscose supply range. This would produce a reduction from current variability of range from about 4 to 5 cPs to a range of typically less than about 1.5 cPs, more typically about 0.2 to 1 cPs.

The invention also provides a product for use in viscose manufacture, which is activated for a VSF process in the 4 to 6 cPs range. Remarkably the variability of this pulp falls to about 1.0 to 0.2 cPs, more typically about 0.4 to 0.2 cPs even if the starting DP before EPT processing is only known to within a very broad range—say about 10 to 12 cPs.

A major advantage of the present invention is that it provides a process including an in-line EPT step, or a gamma radiation step, for pulp treatment and also a means of process control in such treatment.

The invention also provides an improved viscosity reduction and control method for all pulp products.

The invention also allows the process to more readily be converted to a TCF process through the removal of the need for a hypochlorite stage, with associated environmental benefits, for example significant reduction in absorbable organic halide (AOX) and/or total organic halide (TOX) levels.

It can therefore be seen that the invention provides an improved process control methodology and a process which are simpler than existing off-line EPT treatments (and a product produced by such process). In providing inter alia a reduction in off-specification material, the process can result in substantial savings.

Although certain embodiments only have been described herein, it will be readily apparent to any person skilled in the art that other modifications and/or variations of the invention are possible. Such modifications and/or variations are therefore to be considered as falling within the spirit and scope of the invention as herein claimed and/or described and exemplified. For example it has been noted that dose requirements need to be adjusted with the a purity of the cellulose feed material in a similar manner to that known for a conventional chemical DP reduction step.

The invention claimed is:

1. A process for producing chemical wood pulp including the step of wood digestion followed by a bleaching sequence including any combination of treatment by: oxygen (O), chlorine (C), sodium hydroxide (E), chlorine dioxide (D), hydrogen peroxide (P), ozone (Z) or sodium hypochlorite (H);

wherein an electron processing technology (EPT) step is applied in a fixed radiation dose to the wood pulp on an in-line basis after a chemical degree of polymerization (DP) reduction stage of the bleaching sequence such that the variation of the pulp viscosity or DP of the wood pulp after the EPT step is in a range of about 0.2 to 1 cPs, and a radiation dose-viscosity relationship curve is used for determining the fixed dose of radiation which is used in the EPT step.

2. The process of claim 1, wherein the radiation dose is in the range of about 1.5 to 25 kGrays.

3. The process of claim 2, wherein the chemical DP reduction stage is eliminated and replaced by the in-line EPT step.

4. The process of claim 3, wherein the eliminated chemical DP reduction stage is a hypochlorite treatment stage (H).

5. The process of claim 2, wherein the EPT step is applied after a hypochlorite stage (H) in a high dosage range of about 10 to 25 kGrays and the final product viscosity is in the range of about 4 to 6 cPs.

6. The process of claim 5, wherein the variation of the pulp viscosity of the final product is in a range of about 0.2 to 0.4 cPs.

7. The process of claim 6, wherein no measurement of DP is taken post a cooking/digestion stage other than that needed to control such stage and a fixed radiation dose is applied to reach a selected final product viscosity.

8. The process of claim 1, wherein the EPT step is applied after a hypochlorite stage (H) in a low dosage range of about 0.1 to 5 kGrays and the final product viscosity is in the range of about 14 to 20 cPs.

9. The process of claim 8, wherein the EPT step is applied in a dosage range of about 1.5 to 3 kGrays.

10. The method of claim 1, wherein the relationship curve approximates to a log, power or exponential response.

* * * * *